(12) United States Patent
Suzuki et al.

(10) Patent No.: US 10,138,837 B2
(45) Date of Patent: Nov. 27, 2018

(54) AIR FUEL RATIO CONTROL FOR AN INTERNAL COMBUSTION ENGINE THAT CAN BE OPERATED WITH FUELS AT DIFFERENT PROPERTIES

(71) Applicant: TOYOTA JIDOSHA KABUSHIKI KAISHA, Toyota-shi, Aichi (JP)

(72) Inventors: Naoki Suzuki, Hadano (JP); Satoshi Taniguchi, Numazu (JP); Ryoji Nishiumi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 16 days.

(21) Appl. No.: 15/322,610

(22) PCT Filed: Jun. 30, 2015

(86) PCT No.: PCT/JP2015/003287
§ 371 (c)(1),
(2) Date: Dec. 28, 2016

(87) PCT Pub. No.: WO2016/006201
PCT Pub. Date: Jan. 14, 2016

(65) Prior Publication Data
US 2017/0175663 A1   Jun. 22, 2017

(30) Foreign Application Priority Data

Jun. 30, 2014 (JP) .................................. 2014-135262
Jun. 8, 2015 (JP) .................................. 2015-116147

(51) Int. Cl.
*F02D 41/26* (2006.01)
*F02D 41/24* (2006.01)
(Continued)

(52) U.S. Cl.
CPC ....... *F02D 41/2448* (2013.01); *F02D 19/024* (2013.01); *F02D 19/029* (2013.01);
(Continued)

(58) Field of Classification Search
CPC ............. F02D 41/2448; F02D 41/0027; F02D 41/123; F02D 41/1454; F02D 41/2467;
(Continued)

(56) References Cited

U.S. PATENT DOCUMENTS 5,193,339 A * 3/1993 Furuya ................ F02D 41/1441
                                                                      123/674
5,299,546 A   4/1994 Kato et al.
(Continued)

FOREIGN PATENT DOCUMENTS

JP     2011-220253    11/2011
JP     2013-130123    7/2013
WO     WO 2013/076811 A1   5/2013

*Primary Examiner* — Mahmoud Gimie
(74) *Attorney, Agent, or Firm* — Finnegan, Henderson, Farabow, Garrett & Dunner, LLP

(57) ABSTRACT

The air-fuel ratio feedback control is performed by using a first correction value which is determined depending on a difference between a detected air-fuel ratio (A/F) of an air-fuel mixture and a target A/F and a second correction value which is determined depending on the property of the fuel. Further, fuel property learning control is carried out to correct the first correction value and the second correction value so that an absolute value of the first correction value is not more than a threshold value, when the absolute value of the first correction value is larger than the threshold value after performing the charging with fuel. A combustion continuing correction value range, which is a range of the second correction value to allow the A/F of the mixture to be included in an A/F range in which combustion can be continued, is stored, and the second correction value is set to a value within the combustion continuing correction value
(Continued)

range if the A/F feedback control and the fuel property learning control are interrupted.

4 Claims, 6 Drawing Sheets

(51) Int. Cl.
    *F02D 41/12*     (2006.01)
    *F02D 41/14*     (2006.01)
    *F02D 19/02*     (2006.01)
    *F02D 41/00*     (2006.01)
    *F02D 19/00*     (2006.01)

(52) U.S. Cl.
    CPC ....... *F02D 41/0027* (2013.01); *F02D 41/123* (2013.01); *F02D 41/1454* (2013.01); *F02D 41/2441* (2013.01); *F02D 41/2451* (2013.01); *F02D 41/2467* (2013.01); *F02D 41/26* (2013.01); *F02D 2200/0611* (2013.01); *F02D 2200/0612* (2013.01); *Y02T 10/32* (2013.01)

(58) Field of Classification Search
    CPC .... F02D 41/2454; F02D 41/26; F02D 19/024; F02D 19/029
    USPC .................................................. 123/674, 672
    See application file for complete search history.

(56) References Cited

U.S. PATENT DOCUMENTS

| | | | |
|---|---|---|---|
| 6,230,699 B1* | 5/2001 | Mitsutani | F02D 41/0042 123/674 |
| 9,562,489 B2* | 2/2017 | Taniguchi | F02D 41/1456 |
| 2005/0072139 A1 | 4/2005 | Kato | |
| 2012/0255532 A1 | 10/2012 | Kawakatsu | |
| 2014/0303876 A1 | 10/2014 | Taniguchi et al. | |
| 2016/0305359 A1* | 10/2016 | Komoda | F02D 19/087 |

* cited by examiner

[Fig. 1]
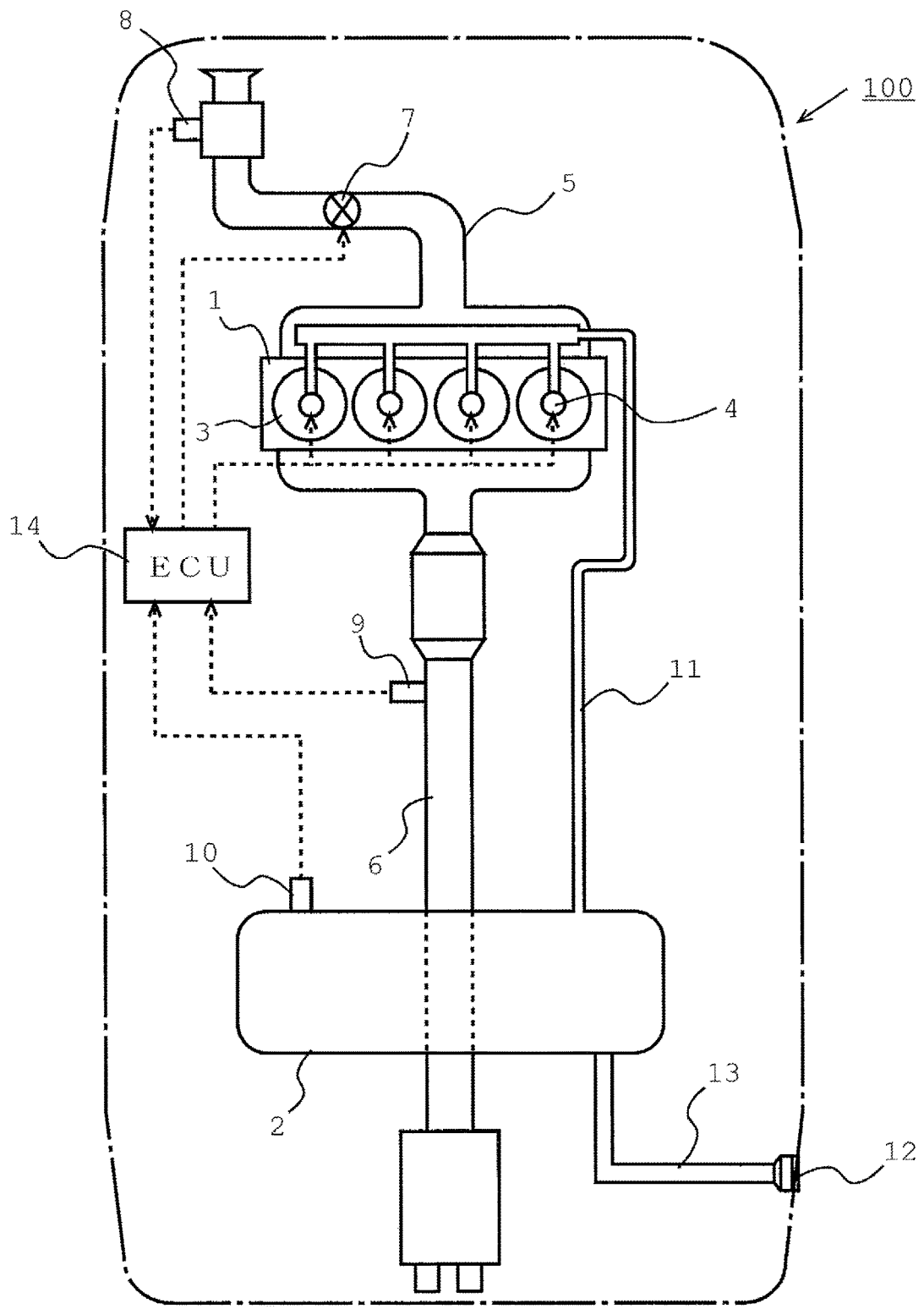

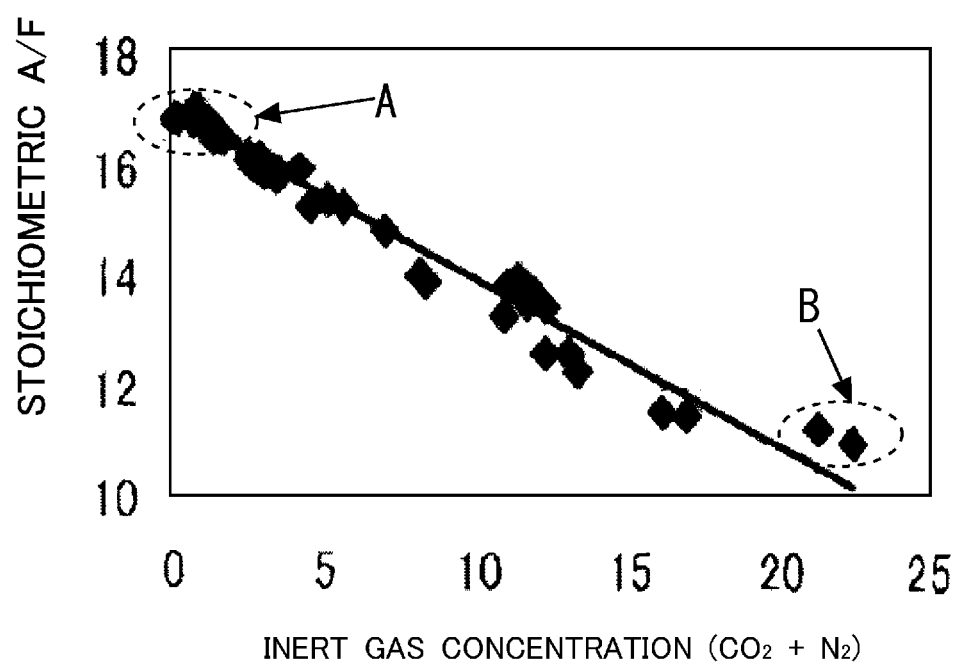

[Fig. 3]
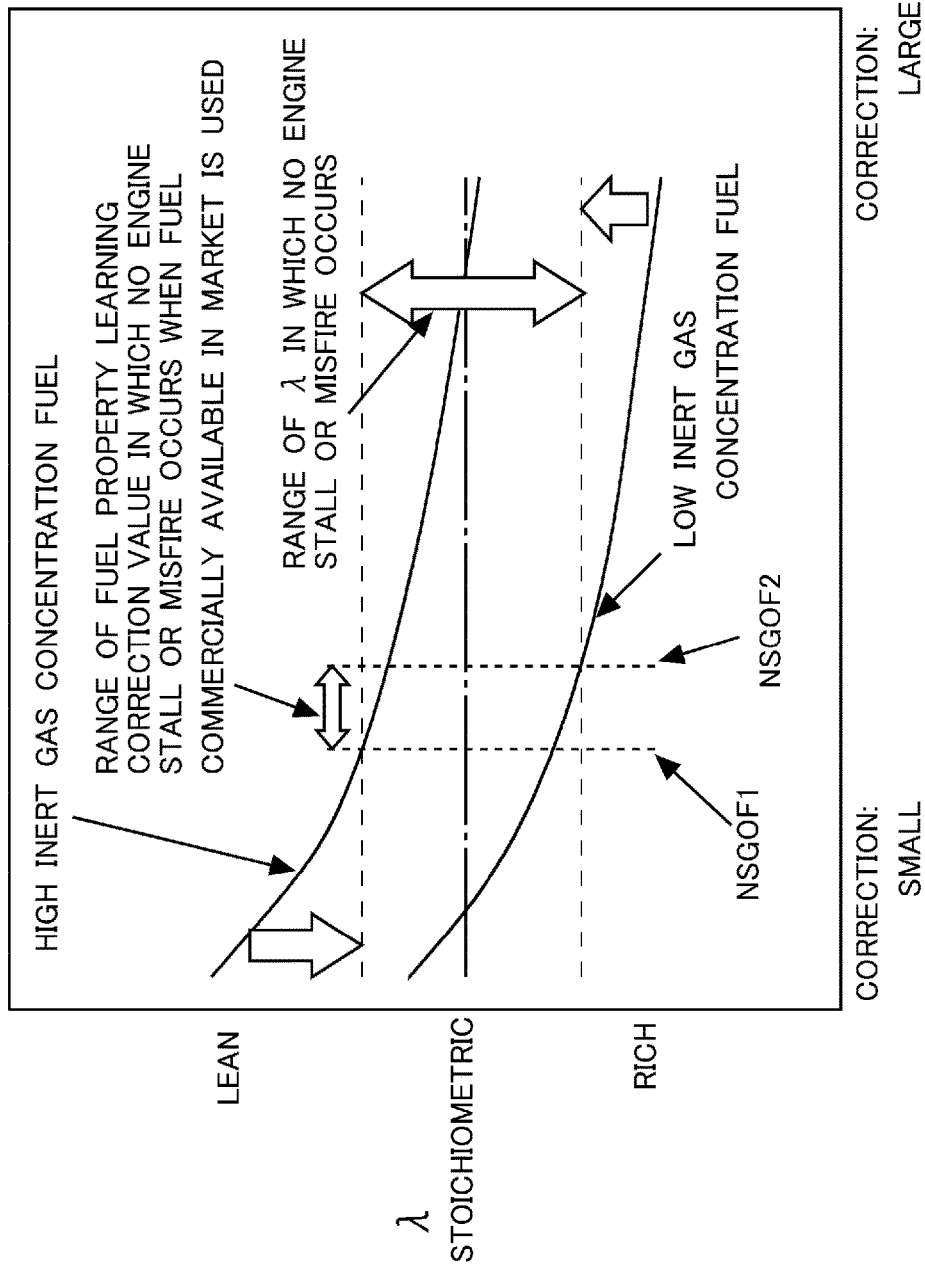

[Fig. 4]
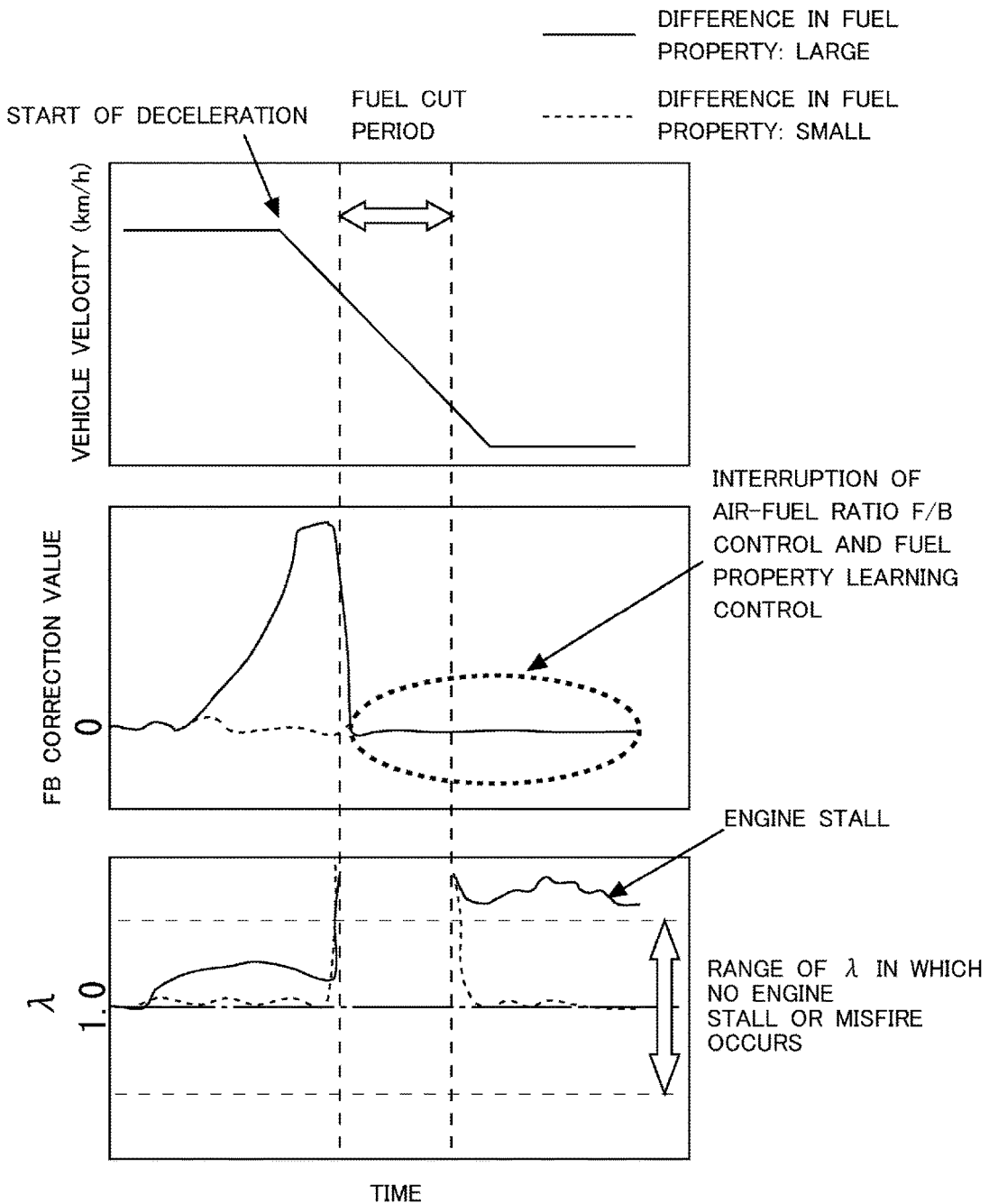

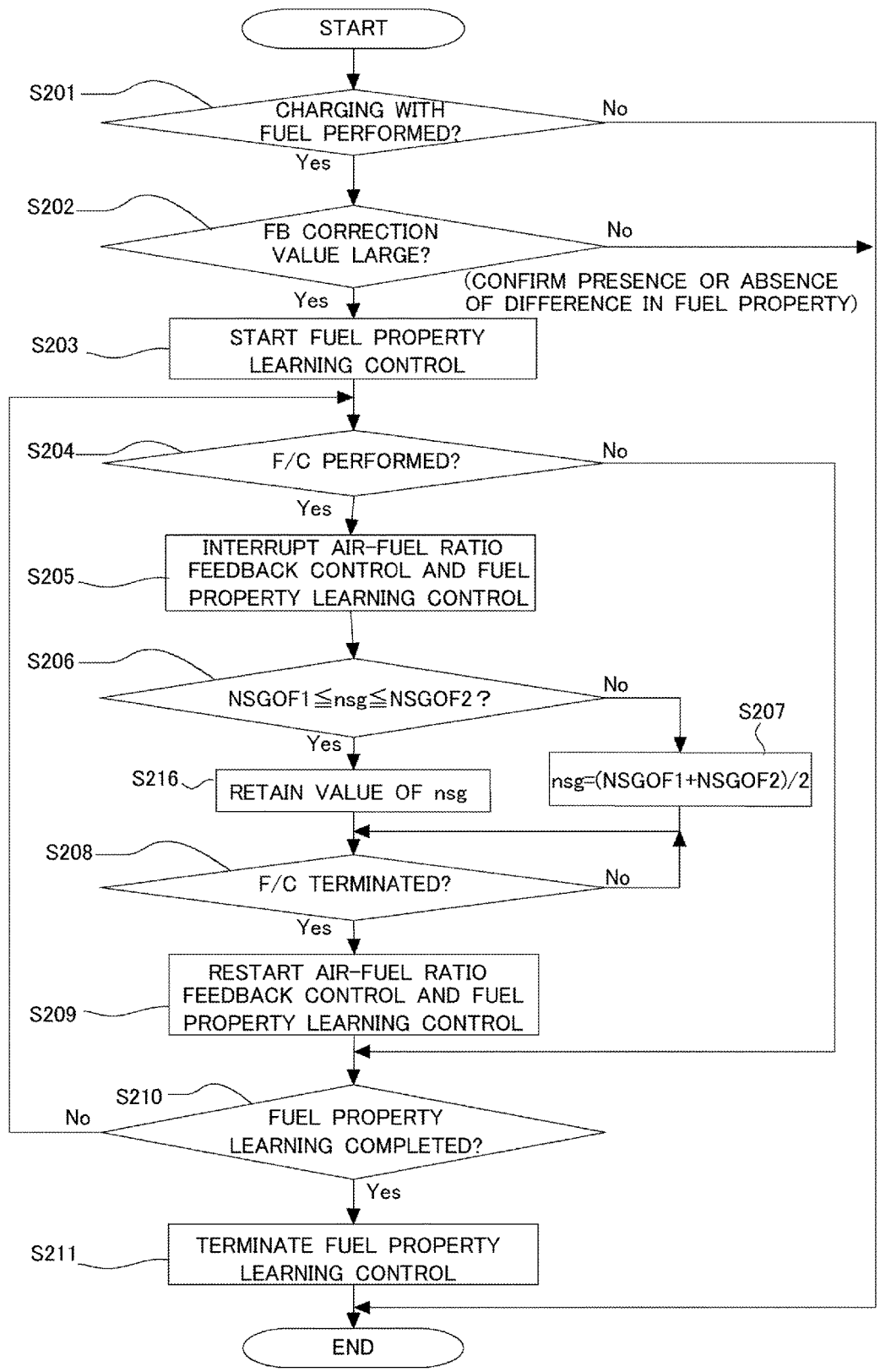
[Fig. 5]

[Fig. 6]
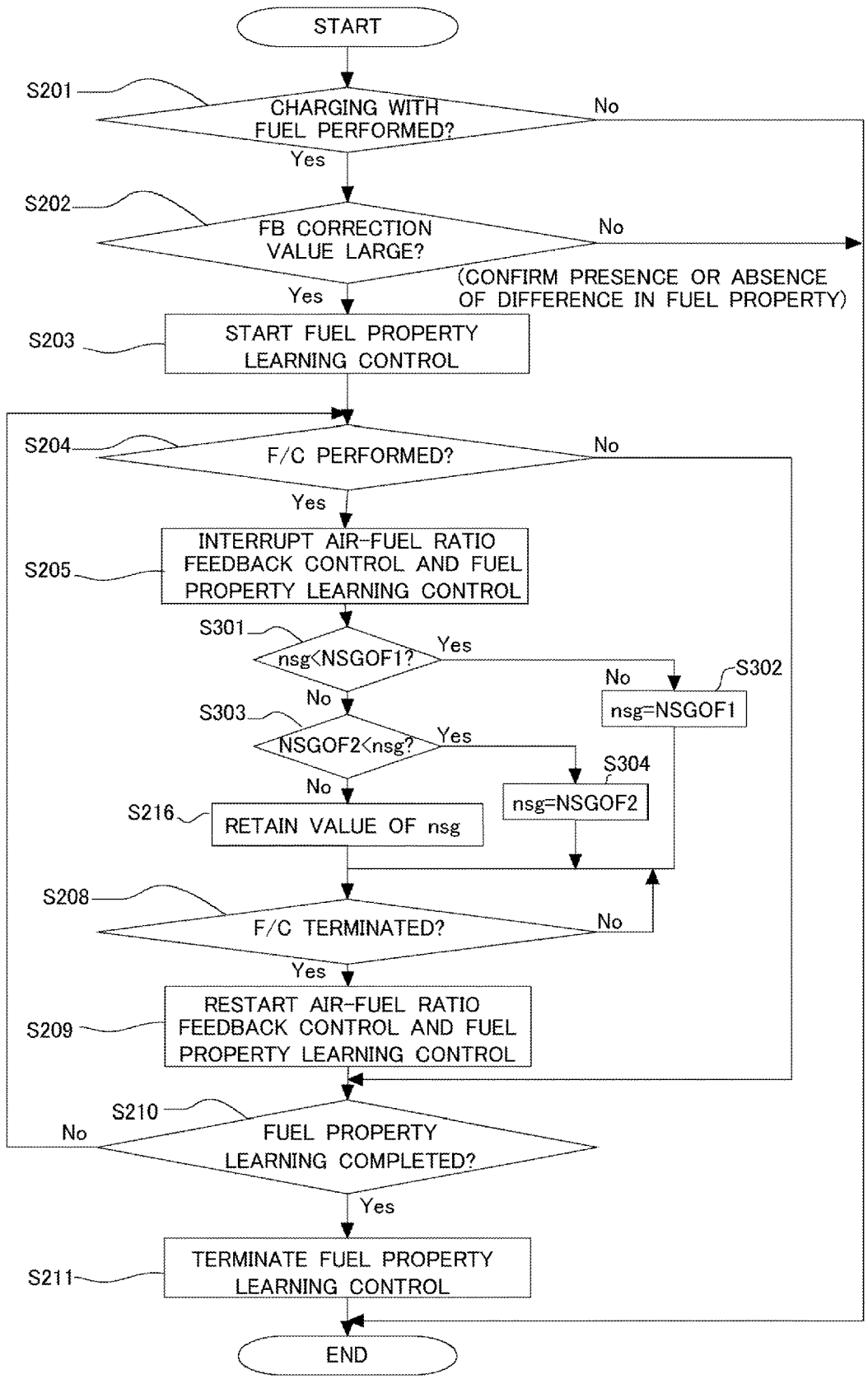

AIR FUEL RATIO CONTROL FOR AN INTERNAL COMBUSTION ENGINE THAT CAN BE OPERATED WITH FUELS AT DIFFERENT PROPERTIES

CROSS-REFERENCE TO RELATED APPLICATIONS

This application is a national phase application of International Application No. PCT/JP2015/003287, filed Jun. 30, 2015, and claims the priority of Japanese Application Nos. 2014- 135262, filed Jun. 30, 2014, and 2015-116147, filed Jun. 8, 2015, the content of all of which is incorporated herein by reference.

TECHNICAL FIELD

The present invention relates to a control system for an internal combustion engine which uses fuel having a possibility that a property (character or nature) may change every time when charging is performed.

BACKGROUND ART

Conventionally, it is known that the air-fuel ratio feedback control is performed to correct the fuel injection amount so that the air-fuel ratio of an air-fuel mixture to be combusted in an internal combustion engine is equivalent to a target air-fuel ratio. In particular, when the air-fuel ratio feedback control is executed by means of a control system for an internal combustion engine which uses compressed natural gas (CNG), it is required that the internal combustion engine can be properly operated even when the property of CNG is changed. For this purpose, such a technique is known that a parameter, which relates to the combustion state of the air-fuel mixture, is corrected in accordance with the learning control on the basis of the magnitude of the correction value of the fuel injection amount in the air-fuel ratio feedback control after the charging is performed with fuel (see, for example, Patent Literature 1).

That is, in the case of the internal combustion engine which uses the fuel having a possibility that the property may change every time when the charging is performed, it has been feared that the engine stall or the misfire may arise if the same combustion condition is maintained, resulting from the fact that the stoichiometric air-fuel ratio is changed between the situations provided before and after the charging with the fuel. As a countermeasure thereagainst, the air-fuel ratio feedback control has been performed in some cases while corresponding to the difference in the fuel property by performing the learning correction control with a second correction value so that the magnitude of a first correction value is decreased if the first correction value, which is used in order to allow the air-fuel ratio of the mixture to approach the target air-fuel ratio in the air-fuel ratio feedback control, has the magnitude that becomes excessively large after the charging with the fuel.

CITATION LIST

Patent Literature

[Patent Literature 1] WO2013/076811A
[Patent Literature 2] JP2013-130123A
[Patent Literature 3] JP2011-220253A

SUMMARY OF INVENTION

Technical Problem

In the case of the control described above, a certain extent of time is required until the learning correction control adapted to the fuel property is completed and the magnitude of the second correction value has a proper value. Further, if it is necessary to stop the combustion due to a requirement of stopping the engine and the air-fuel ratio feedback control and the learning correction control adapted to the fuel property are interrupted, then the control parameter (for example, the first correction value) is reset. Therefore, if the air-fuel ratio feedback control and the fuel property learning control are restarted, then the value of the control parameter is greatly changed as compared with that used before the interruption, and the difference is increased between the air-fuel ratio of the mixture and the target air-fuel ratio. As a result, it has been feared that the engine stall or the misfire may occur.

The present invention has been made taking the foregoing circumstances into consideration, and the present invention is directed to an internal combustion engine which uses fuel having a possibility that the property may change every time when charging is performed. The present invention relates to a control system for an internal combustion engine to carry out the fuel property learning control in which a fuel injection amount is determined while learning a second correction value so that an absolute value of a first correction value is not more than a threshold value if a magnitude of the first correction value is larger than the threshold value in the air-fuel ratio feedback control in which an air-fuel ratio of a mixture is allowed to approach a target air-fuel ratio especially after performing the charging with fuel.

An object of the present invention is to provide a technique which makes it possible to suppress the occurrence of such a situation that the difference is excessively increased between the air-fuel ratio of the mixture and the target air-fuel ratio and the combustion becomes unstable, even after the air-fuel ratio feedback control and the fuel property learning control are interrupted or discontinued and then they are restarted.

Solution to Problem

In order to achieve the object as described above, the present invention provides a control system for an internal combustion engine which uses fuel having a possibility that a property may change every time when charging is performed, the control system for the internal combustion engine comprising:

air-fuel ratio feedback control means which carries out air-fuel ratio feedback control for determining a fuel injection amount so that an air-fuel ratio approaches a target air-fuel ratio by using a first correction value which is determined depending on a difference between a detected air-fuel ratio of an air-fuel mixture combusted in the internal combustion engine and the target air-fuel ratio and a second correction value which is determined depending on the property of the fuel; and fuel property learning means which carries out fuel property learning control for correcting the second correction value so that an absolute value of the first correction value is not more than a predetermined threshold value in the air-fuel ratio feedback control if the absolute value of the first correction value is larger than the predetermined threshold value in the air-fuel ratio feedback control after performing the charging with the fuel; and the control system for the internal combustion engine further comprising:

storage means which stores a combustion continuing correction value range as such a range of the second correction value that allows an air-fuel ratio of an air-fuel mixture to be included in an air-fuel ratio range in which combustion can be continued in the internal combustion engine;

judging means which judges whether or not the air-fuel ratio feedback control and the fuel property learning control are interrupted after the fuel property learning control is started by the fuel property learning means; and setting means which performs setting such that the second correction value, which is to be used when the air-fuel ratio feedback control and the fuel property learning control are restarted, is within the combustion continuing correction value range stored in the storage means, if it is judged by the judging means that the air-fuel ratio feedback control and the fuel property learning control are interrupted.

In this context, such a situation is assumed that the air-fuel ratio feedback control and the fuel property learning control are interrupted or discontinued, and then they are restarted, after the charging with the fuel is performed, and the fuel property learning control performed by the fuel property learning means is started. In such a situation, the control parameter (for example, the first correction value) is reset in response to the interruption of the air-fuel ratio feedback control and the fuel property learning control. Therefore, it is feared that the value of the control parameter may be greatly changed as compared with that provided before the interruption, when the air-fuel ratio feedback control and the fuel property learning control are restarted. Accordingly, especially when the property of the fuel subjected to the charging is greatly changed from that of the fuel having been previously used, then the stoichiometric air-fuel ratio is changed on account of the change of the property, and hence the gap (deviation or divergence) is increased between the air-fuel ratio of the mixture and the target air-fuel ratio. It is feared that the engine stall or the misfire is consequently caused in some cases in the internal combustion engine.

On the contrary, in the present invention, if it is judged by the judging means that the air-fuel ratio feedback control and the fuel property learning control are interrupted, the setting means performs the setting such that the second correction value, which is to be used when the air-fuel ratio feedback control and the fuel property learning control are restarted, is the value within the combustion continuing correction value range stored in the storage means.

Accordingly, the air-fuel ratio of the mixture in the internal combustion engine can be included in the air-fuel ratio range in which the combustion can be continued on condition that the fuel, which is commercially available in the market and which is assumed to be used for the internal combustion engine, is used, after the fuel property learning control is restarted. As a result, it is possible to suppress the occurrence of the engine stall or the misfire in the internal combustion engine even in a state in which the second correction value is not converged after the air-fuel ratio feedback control and the fuel property learning control are restarted.

Further, in the present invention, the fuel having the possibility that the property may change every time when the charging is performed may be compressed natural gas. By doing so, it is possible to suppress the occurrence of the engine stall or the misfire after the air-fuel ratio feedback control and the fuel property learning control are interrupted and then restarted in the internal combustion engine which uses, as the fuel, the compressed natural gas that is a typical example of the fuel having the possibility that the property may change every time when the charging is performed in the present circumstances. However, it is not intended by this fact that the fuel having the possibility that the property may change every time when the charging is performed in the present invention is limited to the compressed natural gas.

Further, in the present invention, the judging means may judge whether or not the air-fuel ratio feedback control and the fuel property learning control are interrupted by judging whether fuel cut, which is to be performed in accordance with a request for deceleration, is present or absent.

In this case, when the deceleration request is made by a driver, the fuel cut is carried out in some cases. The air-fuel ratio feedback control and the fuel property learning control are interrupted during the period in which the fuel cut is carried out. As described above, the control parameter (for example, the first correction value) is reset in accordance with the interruption of the air-fuel ratio feedback control and the fuel property learning control. Accordingly, when the fuel cut is canceled, and the air-fuel ratio feedback control and the fuel property learning control are restarted, then it is feared that the value of the control parameter may be greatly changed as compared with that provided before the interruption. As a result, especially when the property of the fuel subjected to the charging is greatly changed from that of the fuel having been previously used, then the stoichiometric air-fuel ratio is changed, and hence the gap is increased between the air-fuel ratio of the mixture and the target air-fuel ratio. It is feared that the engine stall or the misfire is consequently caused in some cases in the internal combustion engine.

On the contrary, in the present invention, the judging means judges whether or not the air-fuel ratio feedback control and the fuel property learning control are interrupted by judging the presence or absence of the fuel cut based on the deceleration request. If it is judged by the judging means that the fuel cut based on the deceleration request is performed, the setting means performs the setting such that the second correction value is the value within the combustion continuing correction value range stored in the storage means.

Accordingly, the air-fuel ratio of the mixture in the internal combustion engine is allowed to be included in the air-fuel ratio range in which at least the combustion can be continued on condition that the fuel, which is commercially available in the market and which is assumed to be used for the internal combustion engine, is used, immediately after the air-fuel ratio feedback control and the fuel property learning control are restarted after the fuel cut is canceled. As a result, it is possible to suppress the occurrence of the engine stall or the misfire in the internal combustion engine even in a state in which the second correction value is not converged immediately after the air-fuel ratio feedback control and the fuel property learning control are restarted after the fuel cut is canceled.

Note that in the present invention, various cases are assumed for the case in which it is judged by the judging means that the air-fuel ratio feedback control and the fuel property learning control are interrupted, other than the case in which it is judged that the fuel cut is carried out as described above. For example, the following case is assumed for an internal combustion engine in which a plurality of types of fuel such as CNG and gasoline can be used. That is, when the use of gasoline is manually selected by a driver during the high load operation, then it is detected that the fuel to be used is changed to gasoline from CNG having been previously used, and it is judged that the air-fuel ratio feedback control and the fuel property learning control, which have been performed for CNG, are stopped. Further, the following case is assumed for a hybrid vehicle. That is, it is judged that the air-fuel ratio feedback control and the fuel property learning control for an internal combustion engine are interrupted, by being judged that the EV mode is selected.

Further, in the present invention, the setting means may perform the setting such that the second correction value is a maximum value of the combustion continuing correction value range if the second correction value, which is provided at a point in time at which it is judged by the judging means that the air-fuel ratio feedback control and the fuel property learning control are interrupted, is larger than the maximum value of the combustion continuing correction value range, while the setting means may perform the setting such that the second correction value is a minimum value of the combustion continuing correction value range if the second correction value, which is provided at the point in time, is smaller than the minimum value of the combustion continuing correction value range.

Accordingly, if it is judged that the air-fuel ratio feedback control and the fuel property learning control are interrupted, the second correction value is set to the value which is most approximate to the second correction value included in the combustion continuing correction value range provided at the point in time at which it is judged that the air-fuel ratio feedback control and the fuel property learning control are interrupted. As a result, it is possible to decrease the change of the second correction value as small as possible from the point in time at which the air-fuel ratio feedback control and the fuel property learning control are interrupted. It is possible to decrease the change of the combustion state of the internal combustion engine as small as possible. It is possible to suppress the unstabilization of the combustion state of the internal combustion engine.

Note that the means for solving the task of the present invention can be combined and used as far as possible.

Advantageous Effects of Invention

According to the present invention, it is possible to suppress the occurrence of such a situation that the difference is excessively large between the air-fuel ratio of the mixture and the target air-fuel ratio in the internal combustion engine and the occurrence of the engine stall or the misfire even immediately after the air-fuel ratio feedback control and the fuel property learning control are interrupted and then they are restarted in the internal combustion engine which uses the fuel having the possibility that the property may change every time when the charging is performed.

BRIEF DESCRIPTION OF DRAWINGS

FIG. 1 shows a schematic arrangement of a vehicle to which the present invention is applied.

FIG. 2 shows a graph illustrating a relationship between the inert gas concentration of CNG fuel and the stoichiometric air-fuel ratio in an embodiment of the present invention.

FIG. 3 shows an exemplary relationship among the fuel property of CNG, the fuel property learning correction value, and the air excess percentage λ obtained on that condition in the embodiment of the present invention.

FIG. 4 illustrates the influence exerted on the air-fuel ratio of the mixture in an internal combustion engine when the deceleration accompanied by the fuel cut is requested during the fuel property learning control in the first and second embodiments of the present invention.

FIG. 5 shows a flow chart of a fuel property associated control routine in the first embodiment of the present invention.

FIG. 6 shows a flow chart of a fuel property associated control routine 2 in the second embodiment of the present invention.

DESCRIPTION OF EMBODIMENTS

The best mode for carrying out the present invention will be explained in detail below by way of example with reference to the drawings.

Embodiment 1

At first, a first embodiment of the present invention will be explained on the basis of FIGS. 1 to 3. FIG. 1 shows a schematic arrangement of a vehicle to which the present invention is applied. The vehicle shown in FIG. 1 is the vehicle on which an internal combustion engine to use CNG is carried. With reference to FIG. 1, the internal combustion engine 1 and a fuel tank 2 are carried on the vehicle 100. The internal combustion engine 1 is provided with a plurality of cylinders 3 and fuel injection valves 4 which inject fuel into the respective cylinders 3. Further, an intake gas passage 5 and an exhaust gas passage 6 are connected to the internal combustion engine 1. The intake gas passage 5 is the passage which is provided in order that the fresh air (air), which is intaken from the atmospheric air, is introduced to the cylinders 3 of the internal combustion engine 1. An intake gas throttle valve 7 for changing the passage cross-sectional area of the intake gas passage 5 and an intake gas temperature sensor 8 for measuring the temperature (outside air temperature) of the fresh air (air) are attached at intermediate positions of the intake gas passage 5.

The exhaust gas passage 6 is the passage which is provided in order that the burned gas (exhaust gas) discharged from the cylinders 3 is discharged into the atmospheric air after passing through, for example, an exhaust gas purification catalyst and a muffler or silencer. An A/F sensor 9, which outputs an electric signal correlated with the air-fuel ratio of the mixture, is attached at an intermediate position of the exhaust gas passage 6. The fuel tank 2 is the tank which stores the compressed natural gas (CNG). A pressure sensor 10 is attached to the fuel tank 2 in order to measure the pressure in the fuel tank 2. Further, the fuel tank 2 is communicated with the fuel injection valve 4 of the internal combustion engine 1 via a fuel supply tube 11. The fuel supply tube 11 is the passage which is provided in order that CNG contained in the fuel tank 2 is introduced to the fuel injection valve 4. The fuel tank 2 is connected to a charging port 12 via an inlet pipe 13, the charging port 12 being attached to a body of the vehicle 100. The charging port 12 is opened when a charging nozzle, which is arranged, for example, in a gas station, is inserted, and CNG supplied from the charging nozzle is introduced to the inlet pipe 13.

ECU 14 is carried on the vehicle 100 constructed as described above. ECU 14 is the electronic control unit which is composed of, for example, CPU, ROM, RAM, and backup RAM. Various sensors, which include, for example, the intake gas temperature sensor 8, the A/F sensor 9, and the pressure sensor 10, are electrically connected to ECU 14. Further, various devices, which include, for example, the fuel injection valve 4 and the intake gas throttle valve 7, are electrically connected to ECU 14. ECU 14 controls the various devices on the basis of the signals inputted from the various sensors.

Further, maps, in which various types of data are stored, are stored in ROM of ECU 14 in addition to programs which relate to the control of the various devices and the internal combustion engine 1. The fuel property associated control routine and the fuel property associated control routine 2 described in the following embodiments are also the programs stored in ROM of ECU 14.

The air-fuel ratio control, which is performed when the property of the fuel is not taken into consideration at all, will now be briefly explained. In this case, ECU 14 computes the fuel injection amount in accordance with the load and the rotation speed of the internal combustion engine 1, and ECU 14 controls the fuel injection valve 4 in accordance with the calculated fuel injection amount. In particular, ECU 14 computes the fuel injection amount (valve opening time of the fuel injection valve 4) in accordance with the following expression (1).

$$\text{Fuel injection amount} = \text{Basic injection amount} \times (1 + A/F \text{ correction value 1}) \quad (1)$$

In the expression (1), the basic injection amount is derived from the map in which, for example, the intake air amount and/or the rotation speed of the engine is/are provided as argument or arguments. The map, which is referred to herein, is previously determined by means of an adaptive process which utilizes, for example, an experiment, and the map is stored in ROM of ECU 14 as described above. Further, the A/F correction value 1 is the correction coefficient (air-fuel ratio feedback correction coefficient) which is provided in order to dissolve the gap between the target air-fuel ratio and the detected air-fuel ratio (air-fuel ratio detected by the A/F sensor 9). The A/F correction value 1 is computed, for example, in accordance with the following expression (2).

$$A/F \text{ correction value 1} = FB \text{ correction value} + \text{Air-fuel ratio learning correction value} \quad (2)$$

In the expression (2) described above, the FB correction value is the correction value (air-fuel ratio feedback correction value) which is determined on the basis of the difference between the target air-fuel ratio and the detected air-fuel ratio. Further, the air-fuel ratio learning correction value is the leaning value which is provided in order to compensate the invariable gap between the target air-fuel ratio and the detected air-fuel ratio (for example, the gap resulting, for example, from the time-dependent change of the injection characteristic of the fuel injection valve 4). In this case, the FB correction value corresponds to the first correction value in this embodiment.

When the fuel injection amount (fuel injection time) is determined in accordance with the expression (1) and the expression (2), the air-fuel ratio of the air-fuel mixture combusted in the cylinder 3 can be thereby allowed to coincide with the target air-fuel ratio. As a result, the output of the internal combustion engine 1 can be allowed to coincide with the required output required by the driver. Otherwise, the property of the exhaust gas can be the property which is suitable for the purification ability of the exhaust gas purification apparatus. Note that it is not necessarily indispensable to introduce the air-fuel ratio learning correction value in the control of the air-fuel ratio described above. In this case, the A/F correction value 1 is the FB correction value itself as expressed by the expression (2)'.

$$A/F \text{ correction value 1} = FB \text{ correction value} \quad (2)'$$

In this context, the property of the compressed natural gas (CNG) is not necessarily uniform, and the property can differ in some cases depending on each of the charging places for performing the charging with CNG. When the fuel tank is charged with CNG, CNG remaining in the fuel tank (hereinafter referred to as "remaining CNG" as well) is mixed with CNG with which the charging is performed (hereinafter referred to as "charging CNG" as well). If the property of the charging CNG is different from that of the remaining CNG, CNG (CNG obtained by mixing the charging CNG and the remaining CNG (hereinafter referred to as "mixed CNG" as well)), which is supplied from the fuel tank to the internal combustion engine 1 after the charging with the charging CNG, has the property which is different from the property of the remaining CNG.

The influence, which is exerted on the operation state of the internal combustion engine by the property change of CNG, is exemplified by the change of the theoretical air-fuel ratio (hereinafter referred to as "stoichiometric A/F" as well) as shown in FIG. 2. In particular, when the concentration of the inert gas (for example, carbon dioxide ($CO_2$) and nitrogen ($N_2$)) contained in the gas fuel is changed, the air-fuel ratio (theoretical air-fuel ratio or stoichiometric A/F), at which CNG contained in the air-fuel mixture and oxygen are reacted with each other neither too much nor too little, is changed. More specifically, the stoichiometric A/F is linearly decreased in accordance with the increase of the inert gas concentration of CNG.

In this case, if the degree of difference in the property between the remaining CNG and the charging CNG is large, the value of the stoichiometric A/F also greatly differs as shown by A and B in FIG. 2. Therefore, if the air-fuel ratio is controlled on the assumption that the fuel property is constant, the gap between the air-fuel ratio of the mixture and the target air-fuel ratio is increased in some cases. As a result, for example, the variation amount of the FB correction value is also increased upon the start of the air-fuel ratio feedback control. Therefore, the combustion performed by the internal combustion engine 1 becomes unstable. There is such a possibility that the engine stall or the misfire may occur.

As a countermeasure thereagainst, in the internal combustion engine 1 of this embodiment, if the absolute value of the FB correction value in the expression (2) is larger than a preset threshold value, then it is decided that the difference in the fuel property is large, and the learning control is performed in relation to the fuel property. In this control, the final fuel injection amount injected from the fuel injection valve 4 is represented by the expression (3) in place of the expression (1).

$$\text{Final injection amount} = \text{Basic injection amount} \times (1 + A/F \text{ correction value 2}) \quad (3)$$

In the expression (3), the basic injection amount is the injection amount which is derived from the map in which, for example, the intake air amount and/or the rotation speed of the engine is/are provided as argument or arguments, in the same manner as in the expression (1). Further, the A/F correction value 2 is the correction value which is provided to optimize the fuel injection amount by correcting the basic injection amount in order to compensate the difference between the target air-fuel ratio and the air-fuel ratio of the mixture detected by the A/F sensor 9 and the change of the stoichiometric A/F caused by the difference in the property between the remaining CNG and the charging CNG.

In this case, the A/F correction value 2 in the expression (3) is determined as the sum of the FB correction value, the air-fuel ratio learning correction value, and the fuel property learning correction value as shown in the expression (4).

A/F correction value 2=FB correction value+Air-fuel ratio learning correction value+Fuel property learning correction value  (4)

In this case, the FB correction value is the correction value which is provided in order to correct the difference between the air-fuel ratio of the mixture detected by the A/F sensor 9 and the target air-fuel ratio in accordance with the feedback control, and the FB correction value functions in the same manner as the FB correction value in the expression (2). Further, the air-fuel ratio learning correction value is the learning value which is provided in order to compensate the invariable gap between the target air-fuel ratio and the air-fuel ratio of the mixture (for example, the gap resulting, for example, from the time-dependent change of the injection characteristic of the fuel injection valve 4). Furthermore, the fuel property learning correction value is the learning value which is added to the FB correction value in order to dissolve the influence of the change of the stoichiometric A/F resulting from the difference in the property between the remaining CNG and the charging CNG.

It is not necessarily indispensable to introduce the air-fuel ratio learning correction value in relation to the A/F correction value 2 as well. In this case, the A/F correction value 2 is provided as shown in the expression (4)'.

A/F correction value 2=FB correction value+Fuel property learning correction value  (4)'

The control of the air-fuel ratio, which is based on the use of at least the FB correction value and the fuel property learning correction value in accordance with the expression (3) and the expression (4) (or the expression (4)') described above, is hereinafter referred to as "air-fuel ratio feedback control".

The air-fuel ratio feedback control is performed by executing the program stored in ROM of ECU 14. In this embodiment, the air-fuel ratio feedback control means is constructed to include ECU 14. In this case, the FB correction value corresponds to the first correction value of this embodiment. Further, the fuel property learning correction value corresponds to the second correction value of this embodiment. An explanation will be made below about a method for determining the fuel property learning correction value described above.

The property change of CNG occurs when the fuel tank 2 is charged with CNG. For example, when the inert gas concentration of the charging CNG is higher than the inert gas concentration of the remaining CNG, the inert gas concentration of the mixed CNG becomes higher than the inert gas concentration of the remaining CNG. On the other hand, when the inert gas concentration of the charging CNG is lower than the inert gas concentration of the remaining CNG, the inert gas concentration of the mixed CNG becomes lower than the inert gas concentration of the remaining CNG.

If the property of the mixed CNG is changed on account of the charging with the charging CNG, the FB correction value is greatly changed in some cases when the air-fuel ratio feedback control is started after the charging with the charging CNG. For example, when the charging CNG, which has the inert gas concentration higher than that of the remaining CNG, is used for the charging, the theoretical air-fuel ratio of the mixed CNG is lower than the theoretical air-fuel ratio of the remaining CNG. Therefore, the air-fuel ratio, which is detected by the A/F sensor 9, is deviated toward the lean side as compared with the target air-fuel ratio. In this situation, the FB correction value is a value (positive value) for increasing the fuel injection amount, and the magnitude of the absolute value thereof is larger than the maximum value which can be reached by the absolute value of the correction value when the property of CNG is constant.

On the other hand, when the charging CNG, which has the inert gas concentration lower than that of the remaining CNG, is used for the charging, the theoretical air-fuel ratio of the mixed CNG is higher than the theoretical air-fuel ratio of the remaining CNG. Therefore, the air-fuel ratio of the mixture, which is detected by the A/F sensor 9, is deviated toward the rich side as compared with the target air-fuel ratio. In this situation, the FB correction value is a value (negative value) for decreasing the fuel injection amount, and the magnitude of the absolute value thereof is larger than the maximum value which can be reached by the absolute value of the correction value when the property of CNG is constant.

Therefore, if the absolute value of the FB correction value is larger than the threshold value when the air-fuel ratio feedback control is started after the replenishment or supply with the charging CNG, then it can be regarded that the property of CNG is changed. Note that the "threshold value" referred to herein is the value which is obtained by adding a margin to the maximum value capable of being reached by the absolute value of the FB correction value, for example, under the condition in which the property of CNG is constant.

Accordingly, ECU 14 updates the fuel property learning correction value if the absolute value of the FB correction value is larger than the threshold value when the air-fuel ratio feedback control is started after the start of the internal combustion engine 1. In particular, ECU 14 adds a predetermined value "a" to the fuel property learning correction value. The predetermined value "a" is set to a positive value when the FB correction value is a positive value, while the predetermined value "a" is set to a negative value when the FB correction value is a negative value. Note that the magnitude of the absolute value of the predetermined value "a" may be either a variable value which is determined depending on the magnitude of the absolute value of the FB correction value (or the difference between the absolute value of the FB correction value and the threshold value) or a fixed value which is previously determined in accordance with an adaptive process by utilizing, for example, an experiment.

ECU 14 subtracts the amount of update (predetermined value "a") of the fuel property learning correction value from the FB correction value if the fuel property learning correction value is updated. Accordingly, the amount of correction, which is accompanied by the property change of CNG, is reflected to the fuel property learning correction value in relation to the A/F correction value 2. Note that the learning process for the fuel property learning correction value is executed preferentially to the learning process for the air-fuel ratio learning correction value, for the following reason. That is, if the learning process for the air-fuel ratio learning correction value is carried out prior to the learning process for the fuel property learning correction value after the replenishment with the charging CNG, the absolute value of the FB correction value is less than the threshold value even when the property of CNG is changed.

When the fuel property learning correction value is updated by means of the method described above, the fuel injection amount (fuel injection time), which is computed in accordance with the expression (3), has a value at which the change of the stoichiometric A/F caused by the property change of CNG can be compensated. As a result, when the property of CNG is changed, then the variation amount of the FB correction value is suppressed, and thus the air-fuel ratio of the air-fuel mixture can be promptly converged to the target air-fuel ratio. Then, the amount of thermal energy, which is generated when the air-fuel mixture is combusted, can be allowed to coincide with a desired amount. Note that the control explained herein, in which the fuel property learning correction value is updated in accordance with the learning process, is referred to as "fuel property learning control" in this embodiment. The fuel property learning control is performed by executing the program stored in ECU 14, and the fuel property learning means of this embodiment is constructed to include ECU 14.

FIG. 3 shows an exemplary relationship among the fuel property of CNG, the fuel property learning correction value, and the air excess percentage λ obtained on that condition. The horizontal axis represents the fuel property learning correction value, and the vertical axis represents the air excess percentage λ. Further, a horizontal line, which is depicted by an alternate long and short dash line at a central position in relation to the vertical axis, indicates the stoichiometric air-fuel ratio (air excess percentage λ=1.0). The range of the air excess percentage λ, which is indicated by an area disposed between horizontal lines depicted by upper and lower broken lines, is a range of the air excess percentage λ in which the engine stall or the misfire is not caused and the combustion can be continued in the internal combustion engine 1.

Further, each of two curved lines depicted by solid lines in FIG. 3 indicates the relationship between the fuel property learning correction value and the air excess percentage λ in relation to each of two types of CNG having different fuel properties. The curved line, which is depicted on the upper side and which is included in the two curved lines, relates to CNG having the high inert gas concentration, and the curved line, which is depicted on the lower side, relates to CNG having the low inert gas concentration. Then, it is considered that CNG, which is commercially available in the market and which is assumed to be used for the internal combustion engine, has the characteristic that is approximately included between the two curved lines. That is, it is affirmed that the two curved lines described above indicate the curved line which is disposed on the leanest side and the curved line which is disposed on the richest side, concerning the relationship between the fuel property learning correction value and the air excess percentage λ in relation to CNG which is commercially available in the market. Then, as appreciated from FIG. 3 as well, it is considered that the engine stall or the misfire is not caused in the internal combustion engine 1 on condition that CNG, which is commercially available in the market at preset, is used, if the fuel property learning correction value is set between NSGOF1 and NSGOF2.

The group of CNG commercially available in the market, in which the curved line of the relationship between the fuel property learning correction value and the air excess percentage λ is included in the range between the two curved lines, corresponds to the fuel group commercially available in the market according to this embodiment. Further, the range of the fuel property learning correction value, in which the value is not less than NSGOF1 and not more than NSGOF2 as shown in FIG. 3, corresponds to the combustion continuing correction value range according to this embodiment. Furthermore, the data of the combustion continuing correction value range is stored in ROM of ECU 14, and ECU 14 corresponds to the storage means according to this embodiment.

Next, an explanation will be made with reference to FIG. 4 about what influence is exerted on the air-fuel ratio of the mixture in the internal combustion engine 1 if the deceleration accompanied by the fuel cut is requested for the internal combustion engine 1 during the air-fuel ratio feedback control and the fuel property learning control. The horizontal axis of FIG. 4 represents the time, indicating the fuel cut period by two vertical lines depicted by broken lines if it is assumed that the deceleration request is made during the air-fuel ratio feedback control and the fuel property learning control and the fuel cut is performed. As for the vertical axes, the vertical axis indicates the change of the vehicle velocity in the upper part of FIG. 4. The vertical axis indicates the change of the FB correction value in the expression (4) in the middle part. The vertical axis indicates the change of the air excess percentage λ in the lower part. Further, curved lines depicted by solid lines in FIG. 4 indicate the behaviors of respective parameters provided when the difference is large between the fuel property of the remaining CNG and the fuel property of the charging CNG. On the other hand, curved lines depicted by dotted lines in FIG. 4 indicate the behaviors of respective parameters provided when the difference is small between the fuel property of the remaining CNG and the fuel property of the charging CNG.

With reference to FIG. 4, if the difference is small between the fuel property of the remaining CNG and the fuel property of the charging CNG as shown in the middle part before the fuel cut period, then the variation amount of the FB correction value is small, and the FB correction value is stable in the vicinity of zero. On the other hand, if the difference is large between the fuel property of the remaining CNG and the fuel property of the charging CNG, then the variation amount of the FB correction value is increased on account of the difference in the fuel property, and the FB correction value is changed so that the FB correction value is greatly deviated from zero. Further, if the FB correction value exceeds the threshold value, then the fuel property learning correction value is updated in accordance with the fuel property learning control, and the value of the FB correction value is also decreased in accordance therewith. Then, the FB correction value is stabilized as well at the point in time at which the proper value is provided after repeatedly updating the fuel property learning correction value.

Such a case is now considered that the deceleration request accompanied by the fuel cut is made for the internal combustion engine 1 during the execution of the fuel property learning control as shown in the upper part of FIG. 4. In general, the air-fuel ratio feedback control and the fuel property learning control are interrupted during the period in which the fuel cut is performed, for the following reason. That is, when the fuel cut is performed, any erroneous correction of the FB correction value in the air-fuel ratio feedback control and any erroneous learning of the fuel property learning correction value in the fuel property learning control easily occur immediately after the fuel cut is canceled.

When the air-fuel ratio feedback control and the fuel property learning control are interrupted by the fuel cut as described above, the FB correction value is reset and returned to zero as shown in the middle part of FIG. 4. In this procedure, if the difference is small between the fuel property of the remaining CNG and the fuel property of the charging CNG, the FB correction value is originally positioned in the vicinity of zero. Therefore, the air excess percentage is not greatly deviated from 1.0 as shown by the dotted line in the lower part of FIG. 4, even immediately after the fuel cut is canceled in the state in which the FB correction value is reset and returned to zero and the air-fuel ratio feedback control and the fuel property learning control are restarted. On the other hand, if the difference is large between the fuel property of the remaining CNG and the fuel property of the charging CNG, the original FB correction value is the value which is greatly deviated from zero. Therefore, the air excess percentage $\lambda$ is greatly deviated from 1.0 as shown by the solid line in the lower part of FIG. 4 to sometimes cause the deviation from the preferable area of $\lambda$, immediately after the fuel cut is canceled in the state in which the FB correction value is reset and returned to zero and the air-fuel ratio feedback control and the fuel property learning control are restarted. As a result, it is feared that the combustion performed by the internal combustion engine 1 may become unstable and the engine stall or the misfire may occur.

In response to the problem as described above, in this embodiment, if the air-fuel ratio feedback control and the fuel property learning control are interrupted by performing the fuel cut during the execution of the air-fuel ratio feedback control and the fuel property learning control, the value of the fuel property learning correction value is set to the value which is included in the range of not less than NSGOF1 and not more than NSGOF2 as shown in FIG. 3. Then, the air-fuel ratio feedback control and the fuel property learning control are restarted by using the fuel property learning correction value set to the value included in the range of not less than NSGOF1 and not more than NSGOF2 after the fuel cut is canceled. Accordingly, it is possible to suppress the occurrence of the engine stall or the misfire in the internal combustion engine 1 even if the deceleration request accompanied by the fuel cut is made before the completion of the fuel property learning control, and the air-fuel ratio feedback control and the fuel property learning control are interrupted, on condition that the fuel, which is used, is commercially available in the market and the fuel is assumed to be used for the internal combustion engine 1.

FIG. 5 shows a flow chart of a fuel property associated control routine in this embodiment. This routine is the program stored in ROM of ECU 14, and this routine is executed by ECU 14 every time when a predetermined time elapses during the operation of the internal combustion engine 1. Note that when this routine is executed, it is premised that the internal combustion engine 1 is operated and the air-fuel ratio feedback control is already executed.

If this routine is executed, it is firstly judged in S201 whether or not the charging with fuel is performed. Specifically, the pressure in the fuel tank 2 is detected by the pressure sensor 10, and the judgment is made depending on whether or not the detected pressure is higher than a threshold value for deciding the charging with fuel. This procedure is based on the fact that the internal pressure of the fuel tank 2 is raised by charging the fuel tank 2 with CNG. The threshold value for deciding the charging with fuel is the threshold value at which it is judged that the charging with fuel is performed if the internal pressure of the fuel tank 2 is not less than the threshold value. The threshold value for deciding the charging with fuel is previously determined theoretically or by any experiment or any simulation. The judgment may be made by detecting the pressure itself as described above. Alternatively, the judgment may be made by detecting the extent of increase of the pressure. If it is judged in S201 that the charging with fuel is not performed, then it is decided that the fuel property is not changed as well, and hence this routine is once terminated. On the other hand, if it is judged that the charging with fuel is performed, then it is decided that there is a possibility that the fuel property of CNG may change, and hence the routine proceeds to S202.

In S202, it is judged whether or not the absolute value of the FB correction value provided in the air-fuel ratio feedback control is larger than the threshold value. In this procedure, if it is judged that the absolute value of the FB correction value is not more than the threshold value, it is decided that the difference in the fuel property is small between the remaining CNG and the charging CNG, and the engine stall or the misfire does not occur in the internal combustion engine 1 even when the fuel property learning control is not performed. Therefore, this routine is once terminated. On the other hand, if it is judged that the absolute value of the FB correction value is larger than the threshold value, it is decided that the difference is large between the fuel property of the remaining CNG and the fuel property of the charging CNG, and it is feared that the engine stall or the misfire may occur in the internal combustion engine 1 unless the fuel property learning control is performed. Therefore, the routine proceeds to S203.

In S203, the fuel property learning control is started. If the process of S203 is terminated, the routine proceeds to S204. In S204, it is judged whether or not the deceleration request accompanied by the fuel cut is made. More specifically, the decision may be made by detecting the operation current of the fuel injection valve 4. Alternatively, a setting is made such that ECU 14 turns ON a predetermined flag when the fuel cut is carried out, and the decision may be made by confirming ON/OFF of the flag. In this procedure, if it is judged that the deceleration request accompanied by the fuel cut is not made, then the air-fuel ratio feedback control and the fuel property learning control are not interrupted as well, and hence the routine proceeds to S210 described later on. On the other hand, if it is judged that the deceleration request accompanied by the fuel cut is made, the routine proceeds to S205. Note that, ECU 14, which executes the process of S204, corresponds to the judging means according to this embodiment.

In S205, the air-fuel ratio feedback control and the fuel property learning control are interrupted. In this case, it is feared that the engine stall or the misfire may occur in the internal combustion engine 1 on account of the interruption of the air-fuel ratio feedback control and the fuel property learning control. Therefore, if the process of S205 is terminated, the routine proceeds to the process of S206.

In S206, it is judged whether or not the fuel property learning correction value nsg, which is provided at the point in time of the interruption of the fuel property learning control in S205, belongs to the range of not less than NSGOF1 and not more than NSGOF2. In this procedure, if it is judged that the fuel property learning correction value nsg belongs to the range of not less than NSGOF1 and not more than NSGOF2, it is judged that the engine stall or the misfire does not occur in the internal combustion engine 1 on condition that the fuel, which is commercially available in the market and which is assumed to be used for the internal combustion engine 1, is used as shown in FIG. 3. Therefore, the routine proceeds to S216, and the routine further proceeds to S208 while retaining the value of nsg.

On the other hand, if it is judged that the fuel property learning correction value nsg does not belong to the range of not less than NSGOF1 and not more than NSGOF2, it is judged that there is any fear of the occurrence of the engine stall or the misfire in the internal combustion engine 1 after canceling the fuel cut and restarting the air-fuel ratio feedback control and the fuel property learning control if the fuel property learning correction value nsg is retained at the current value. Therefore, the routine proceeds to S207.

In S207, the fuel property learning correction value nsg is set to (NSGOF1+NSGOF2)/2. This value corresponds to the median of the range of the fuel property learning correction value nsg in which the engine stall or the misfire does not occur in the internal combustion engine 1. Further, ECU 14, which executes the process of S207, corresponds to the setting means according to this embodiment. If the process of S207 is terminated, the routine proceed to S208.

In S208, it is judged whether or not the fuel cut is terminated. In this procedure, if it is judged that the fuel cut is not terminated, the interruption state of the air-fuel ratio feedback control and the fuel property learning control is continued. Therefore, the fuel property learning correction value nsg is retained within the range of not less than NSGOF1 and not more than NSGOF2 in S216. Otherwise, it is judged in S207 that it is necessary to maintain the state in which the fuel property learning correction value nsg is set to (NSGOF1+NSGOF2)/2. Therefore, the routine returns to the position before the process of S208, and the process of S208 is executed again. That is, the state, in which the fuel property learning correction value nsg is retained within the range of not less than NSGOF1 and not more than NSGOF2 or is set to (NSGOF1+NSGOF2)/2, is maintained until it is judged in S208 that the fuel cut is terminated. If it is judged in S208 that the fuel cut is terminated, the routine proceeds to S209.

In S209, the air-fuel ratio feedback control and the fuel property learning control are restarted. The value of the fuel property learning correction value nsg, which is provided at that time, is the value in which the fuel property learning correction value nsg is retained within the range of not less than NSGOF1 and not more than NSGOF2 in S216, or the value in which the fuel property learning correction value nsg is set to (NSGOF1+NSGOF2)/2 in S207. Therefore, in this routine, the fuel property learning correction value nsg reliably belongs to the range of not less than NSGOF1 and not more than NSGOF2 at the point in time of the restart of the air-fuel ratio feedback control and the fuel property learning control. Then, the fuel property learning correction value nsg is updated in the fuel property learning control. That is, the fuel property learning correction value nsg is gradually updated and changed by adding ±a to the value provided at the point in time of the start as described above. As a result, according to this routine, it is possible to suppress the occurrence of the engine stall or the misfire in the internal combustion engine 1 at the point in time of the restart of the air-fuel ratio feedback control and the fuel property learning control. If the process of S209 is terminated, the routine proceeds to S210.

In S210, it is judged whether or not the fuel property learning is completed. More specifically, it is judged whether or not the value of the FB correction value in the expression (3) is not more than the threshold value. In this procedure, if the FB correction value is not more than the threshold value, it is judged that the fuel property learning is completed and the air-fuel ratio control can be performed in accordance with the ordinary air-fuel ratio feedback control. Therefore, the routine proceeds to S211. On the other hand, if it is judged that the FB correction value is not the value which is not more than the threshold value and the fuel property learning is not completed yet, the routine returns to the position before S204.

In S211, the fuel property learning control is terminated. If the process of S211 is terminated, this routine is once terminated.

As explained above, in this embodiment, if the deceleration request accompanied by the fuel cut is made after the start and before the termination of the fuel property learning control, the value of the fuel property learning correction value is set to the value within the range of the fuel property learning correction value in which the engine stall or the misfire does not occur in the internal combustion engine 1, on condition that the fuel is commercially available in the market and the fuel is assumed to be used for the internal combustion engine 1. Then, the air-fuel ratio feedback control and the fuel property learning control, which have been interrupted by the fuel cut, are restarted by using the fuel property learning correction value when the fuel cut is canceled.

Accordingly, even when the air-fuel ratio feedback control and the fuel property learning control are interrupted on account of the fuel cut, the fuel property learning correction value is set to the value at which the engine stall or the misfire does not occur in the internal combustion engine 1. Therefore, it is possible to suppress the combustion state of the internal combustion engine 1 from being unstabilized upon the restart of the air-fuel ratio feedback control and the fuel property learning control.

In particular, in this embodiment, when the deceleration request accompanied by the fuel cut is made after the start and before the termination of the fuel property learning control, if the fuel property learning correction value nsg does not belong to the range of not less than NSGOF1 and not more than NSGOF2 in that situation, then the value of the fuel property learning correction value nsg is set to (NSGOF1+NSGOF2)/2. Accordingly, the value of the fuel property learning correction value nsg can be set to the median of the fuel property learning correction value at which the engine stall or the misfire does not occur in the internal combustion engine 1 on condition that the fuel is commercially available in the market and the fuel is assumed to be used for the internal combustion engine 1. As a result, it is possible to more reliably suppress the combustion state of the internal combustion engine 1 from being unstabilized upon the restart of the air-fuel ratio feedback control and the fuel property learning control.

However, in this embodiment, it is not necessarily indispensable that the fuel property learning correction value nsg is set to (NSGOF1+NSGOF2)/2. If the fuel property learning correction value nsg is set to the value within the range of not less than NSGOF1 and not more than NSGOF2, then it is possible to stabilize the combustion state of the internal combustion engine 1, and it is possible to avoid the occurrence of the engine stall or the misfire.

Embodiment 2

Next, a second embodiment of the present invention will be explained. In this embodiment, an explanation will be made about such an example that the fuel property learning control is firstly executed if the fuel tank is charged with the fuel, and the fuel property learning correction value nsg is set to a value which is included in the range of not less than NSGOF1 and not more than NSGOF2 and which decreases the change of the fuel property learning correction value as small as possible if any circumstance to interrupt the fuel property learning control arises. Note that the schematic arrangement of the internal combustion engine 1 in this embodiment is equivalent to that explained in the first embodiment.

FIG. 6 shows a flow chart of a fuel property associated control routine 2 according to the present invention. The difference between this routine and the fuel property associated control routine explained in the first embodiment is that the processes of S301 to S304 are executed in place of S206 to S207 of the fuel property associated control routine. As for the other processes, the processes of this routine are equivalent to those of the fuel property associated control routine. Therefore, in this section, an explanation will be made about only the processes which are different from each other between the both routines.

In S204 of this routine, if it is judged that the deceleration request accompanied by the fuel cut is made, the routine proceeds to S301. In S301, it is judged whether or not the fuel property learning correction value nsg, which is provided at the point in time of the interruption of the fuel property learning control in S205, is smaller than NSGOF1 that is the minimum value of the range of the fuel property learning correction value at which it is considered that the engine stall or the misfire does not occur in the internal combustion engine 1 on condition that the fuel is commercially available in the market. In this procedure, if it is judged that the fuel property learning correction value nsg is smaller than NSGOF1, the routine proceeds to S302. On the other hand, in this procedure, if it is judged that the fuel property learning correction value nsg is not less than NSGOF1, the routine proceeds to S303.

In S302, the fuel property learning correction value nsg is set to NSGOF1 that is the minimum value of the range of the fuel property learning correction value in which it is considered that the engine stall or the misfire does not occur in the internal combustion engine 1. In this case, when the fuel property learning correction value nsg is set to NSGOF1, it is thereby possible to make the setting within the range of the fuel property learning correction value in which it is considered that the engine stall or the misfire does not occur in the internal combustion engine 1, while decreasing the change of the fuel property learning correction value nsg as small as possible. If the process of S302 is terminated, the routine proceeds to S208.

Subsequently, in S303, it is judged whether or not the fuel property learning correction value nsg is larger than NSGOF2 that is the maximum value of the range of the fuel property learning correction value in which it is considered that the engine stall or the misfire does not occur in the combustion state of the internal combustion engine 1, on condition that the fuel is commercially available in the market. In this procedure, if it is judged that the fuel property learning correction value nsg is larger than NSGOF2, the routine proceeds to S304. On the other hand, if it is judged that the fuel property learning correction value nsg is not more than NSGOF2, it is decided that the fuel property learning correction value nsg belongs to the range of not less than NSGOF1 and not more than NSGOF2. Therefore, the routine proceeds to S216, and the routine proceeds to S208 while retaining the value of nsg.

In S304, the fuel property learning correction value nsg is set to NSGOF2 that is the maximum value of the range of the fuel property learning correction value in which it is considered that the engine stall or the misfire does not occur in the internal combustion engine 1. In this case, when the fuel property learning correction value nsg is set to NSGOF2, it is thereby possible to make the setting within the range of the fuel property learning correction value in which it is considered that the engine stall or the misfire does not occur in the combustion state of the internal combustion engine 1, while decreasing the change of the fuel property learning correction value nsg as small as possible. If the process of S304 is terminated, the routine proceeds to S208. Note that ECU 14, which executes the processes of S302 and S304 of this routine, corresponds to the setting means according to this embodiment.

The processes of S208 to S211 are equivalent to the processes of the fuel property associated control routine, any explanation of which is omitted herein.

According to this embodiment, it is possible to make the setting to the value at which the change of the fuel property learning correction value is the smallest, within the range of the fuel property learning correction value in which it is considered that the engine stall or the misfire does not occur in the internal combustion engine 1, depending on the value of the fuel property learning correction value nsg. Accordingly, it is possible to suppress the engine stall or the misfire, while decreasing the change of the combustion state of the internal combustion engine 1 as small as possible.

Note that in the embodiments described above, the present invention has been explained, in which CNG is referred to by way of example as the fuel having the possibility that the property may change every time when the charging is performed. However, the fuel having the possibility that the property may change every time when the charging is performed is not limited to CNG. The present invention is also applicable to any other internal combustion engine provided that the internal combustion engine uses the fuel having the characteristic as described above. For example, the present invention is also applicable to an internal combustion engine which uses ethanol as the fuel.

Note that in the present invention, it is judged that the air-fuel ratio feedback control and the fuel property learning control are interrupted in accordance with the judgment that the fuel cut is carried out, the judgment being made the judging means. However, the judgment basis, on which it is judged that the air-fuel ratio feedback control and the fuel property learning control are interrupted, is not limited to the presence or absence of the fuel cut. For example, when the use of gasoline is manually selected by a driver for an internal combustion engine which can use a plurality of types of fuel of CNG and gasoline as described above, it is detected that the fuel to be used is changed to gasoline from CNG having been previously used, in accordance with which it is also allowable to judge that the air-fuel ratio feedback control and the fuel property learning control for CNG are interrupted. Further, it is also allowable to judge that the air-fuel ratio feedback control and the fuel property learning control for an internal combustion engine are interrupted in accordance with the judgment that the EV mode is selected for a hybrid vehicle.

REFERENCE SIGNS LIST

1: internal combustion engine, 2: fuel tank, 3: cylinder, 4: fuel injection valve, 5: intake gas passage, 6: exhaust gas passage, 7: intake gas throttle valve, 8: intake gas temperature sensor, 9: A/F sensor, 10: pressure sensor, 11: fuel supply tube, 12: charging port, 13: inlet pipe, 14: ECU, 100: vehicle.

The invention claimed is:

1. A control system for an internal combustion engine which uses fuel having a possibility that a property may change every time being charged, the control system for the internal combustion engine comprising:

a controller, comprising at least one processor, configured to:
perform air-fuel ratio feedback control for determining a fuel injection amount so that an air-fuel ratio approaches a target air-fuel ratio, in which a first correction value is determined depending on a difference between a detected air-fuel ratio of an air-fuel mixture com busted in the internal combustion engine and the target air-fuel ratio, and the fuel injection amount is determined using the first correction value and a second correction value; and
when an absolute value of the first correction value in the air-fuel ratio feedback control becomes larger than a predetermined threshold value after fuel is charged, perform fuel property learning control for correcting the second correction value so that the absolute value of the first correction value becomes not more than the predetermined threshold value; and
a storage storing a fuel property learning correction value range as such a range of the second correction value that allows an air-fuel ratio of an air-fuel mixture to be included in an air-fuel ratio range in which combustion can be continued in the internal combustion engine;
wherein the controller is further configured to:
interrupt the air-fuel ratio feedback control and the fuel property learning control after the fuel property learning control is started; and
when the air-fuel ratio feedback control and the fuel property learning control are interrupted, perform setting such that the second correction value, which is to be used when the air-fuel ratio feedback control and the fuel property learning control are restarted, is within the fuel property learning correction value range stored in the storage.

2. The control system for the internal combustion engine according to claim 1, wherein the fuel having the possibility that the property may change every time being charged is compressed natural gas.

3. The control system for the internal combustion engine according to claim 1, wherein the controller is configured to interrupt the air-fuel ratio feedback control and the fuel property learning control by judging that a fuel cut, which is to be performed in accordance with a request for deceleration, is performed while the fuel property learning control is performed.

4. The control system for the internal combustion engine according to claim 1, wherein the controller is configured to perform the setting such that the second correction value is a maximum value of the fuel property learning correction value range when the second correction value, which is provided at a point in time at which the air-fuel ratio feedback control and the fuel property learning control are interrupted, is larger than the maximum value of the fuel property learning correction value range, and to perform the setting such that the second correction value is a minimum value of the fuel property learning correction value range when the second correction value, which is provided at the point in time, is smaller than the minimum value of the fuel property learning correction value range.

* * * * *